United States Patent [19]
Ryder et al.

[11] Patent Number: 4,738,530
[45] Date of Patent: Apr. 19, 1988

[54] INSPECTION DEVICE

[75] Inventors: Francis E. Ryder; Richard Rabenau, both of Arab; Rowland W. Kanner, Guntersville, all of Ala.

[73] Assignee: National Patent Development Corporation, New York, N.Y.

[21] Appl. No.: 883,969

[22] Filed: Jul. 10, 1986

[51] Int. Cl.$^4$ .............................................. G01B 9/00
[52] U.S. Cl. ........................................... 356/124; 8/507
[58] Field of Search ..................... 356/399, 124; 8/507

[56] References Cited
U.S. PATENT DOCUMENTS

| | | | |
|---|---|---|---|
| 3,519,357 | 7/1970 | Davis | 356/124 |
| 3,985,445 | 10/1976 | Tagnon | 350/245 |
| 4,232,966 | 11/1980 | Schpak et al. | 356/124 |

Primary Examiner—R. A. Rosenberger
Assistant Examiner—Crystal D. Cooper
Attorney, Agent, or Firm—Richard A. Giangiorgi; Irene J. Frangos

[57] ABSTRACT

An inspection device for visually ascertaining the desired alignment of a contact lens in a tinting fixture comprises a base and a platform having a flat surface and mounted to the base for rotation relative thereto. The device also includes an arrangement for mounting the fixture for rotation in unison with the platform and for aligning the fixture relative to the platform flat surface in such a way as to maintain the contact lens in an alignment wherein substantially the entire peripheral edge thereof is located in a plane substantially parallel to the platform flat surface, if the contact lens is in the proper desired alignment in the tinting fixture, and such that the tinting fixture is centered relative to the center of rotation of the platform. A viewing arrangement is provided for visually observing the position of the contact lens peripheral edge during rotation of the platform relative to the base to thereby ascertain whether the contact lens is in the desired alignment relative to the tinting fixture. A method for visually ascertaining the desired alignment of a contact lens in a tinting fixture defining an axis, comprises the steps of aligning the fixture such that the contact lens, if in the desired alignment in the fixture, is substantially centered with respect to the fixture and a peripheral edge thereof defines a plane substantially parallel to a given, substantially flat end surface of the fixture. The method proceed by rotating the fixture about its axis, and visually observing the relative position of the peripheral edge during rotation to thereby ascertain whether the contact lens is in the desired alignment relative to the tinting fixture.

15 Claims, 3 Drawing Sheets

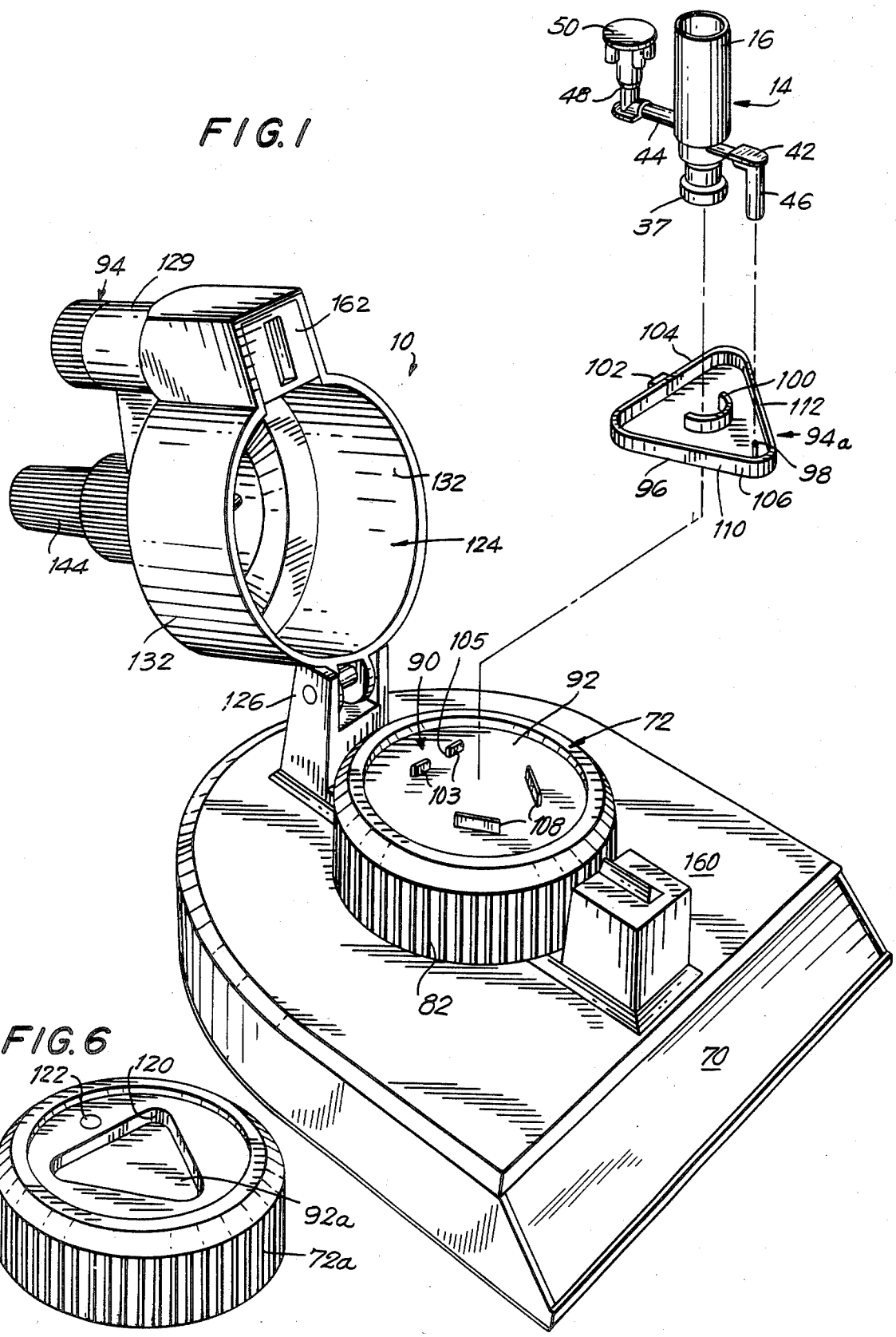
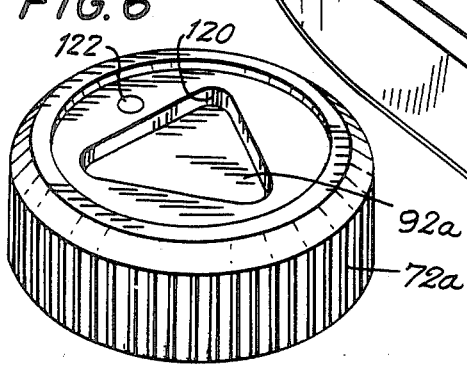

INSPECTION DEVICE

BACKGROUND OF THE INVENTION

This invention is directed generally to an inspection device, and more particularly to a visual inspection device for visually ascertaining or verifying the correct placement and orientation of a contact lens in a tinting fixture, prior to the commencement of a tinting operation.

So-called "soft" contact lenses have gained considerable popularity. Such soft contact lenses are manufactured from a hydrophilic plastics material, such that they can absorb and retain water and hence become soft and pliable upon such absorption. As a result, the lenses are relatively comfortable for the user to wear and in certain instances can be worn for relatively long periods of time.

It has additionally become increasingly desirable to tint or color these soft contact lenses for reasons, for corrective reasons, or for both. For example, tinted lenses can provide cosmetic improvement for persons having one or both eyes which have been disfigured by illness or accident. Such tinted lenses can also be used by patients suffering from one or more disorders such as diplopia, albinism, or aniridism to improve the appearance of the eyes, and hence improve overall general facial appearance. Such tinted lenses can also aid in reducing light transmission so as to give the patient increased visual comfort.

While a number of methods of coloring contact lenses are known, one particularly advantageous method and related apparatus is disclosed in the co-pending U.S. patent application of Richard Rabenau, et al., Ser. No. 592,694, filed Mar. 23, 1984 now U.S. Pat. No. 4,518,390. This co-pending application discloses a method and a tinting fixture apparatus for producing a tinted or colored lens which provides a natural appearance. This type of tinting fixture may further be specially adapted for use in a novel automated contact lens tinting apparatus of the type disclosed in the co-pending application of Francis E. Ryder, et al., Ser. No. 715,095 filed Mar. 22, 1985, now U.S. Pat. No. 4,632,055, which also discloses such a specially adapted tinting fixture.

The tinted lenses produced by the foregoing method and apparatus have a clear central area, a colored intermediate area of generally annular form and a clear outer area. This pattern generally corresponds to the normally colored appearing iris portion of the eye, without producing color over the normally clear or white-appearing sclera of the eye. Generally speaking it is usually desired that the central portion of the lens be untinted or uncolored so as to permit maximum light passage into the eye. Accordingly, the method and apparatus disclosed in the above-mentioned co-pending application provides the lens with such a ring-like or annular tinted area.

As also discussed in the above-mentioned co-pending application, a number of problems can arise in properly mounting a lens on a tinting fixture so as to in effect mask the areas thereof which are to remain untinted or uncolored and permit the tinting solutions or dyes to reach and react with only that ring-like annular area which is to be tinted or colored. However, it is important that the technician not handle the lens directly with the fingers, since minute amounts of oil present on the fingers, if imparted to the lens, may prevent the dye from being accepted or absorbed evenly by the lens. On the other hand, if the technician uses gloves, dexterity may be reduced; however, dexterity is important in manipulating the small lens and centering the lens on the tinting fixture. If the technician uses tweezers or some similar tool to manually mount the lens on a fixture, the procedure can be slow, and accuracy in mounting may be compromised. In this regard, it will be recognized that if the lens is not properly oriented or centered relative to the fixture, the desired annular tinted or colored area will also fail to be centered as desired on the finished, tinted lens.

As suggested above, it is important that the tinted annular or ring-like area of the lens, as well as the clear central portion be relatively precisely defined and accurately located. That is, slight fuzziness or running of the dye colors into the otherwise uncolored areas of the lens will be immediately apparent. Such fuzziness or tint runs, or such off-center location of the tinted area will of course result in the rejection of the finished lens. As in any manufacturing process, a high rate of rejected products is of course to be avoided, consistent with maintaining an optimum rate of production of finished products.

This application additionally discloses a novel inspection or viewing device and related method for use in the foregoing lens tinting process, for ascertaining or verifying the proper placement and orientation of the lens relative to the tinting fixture. That is, the present invention is directed to an inspection device and method for visually observing the lens, following placement in the tinting fixture, to assure that the lens is properly centered with respect to the fixture and that air bubbles in the surrounding fluid are avoided. These considerations help to assure the proper precise definition and location of the tinted areas of the finished lens product.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

FIG. 1 is a partially exploded perspective view of an inspection device or apparatus in accordance with the invention in connection with a lens tinting fixture;

FIG. 6 shows an alternate form of a portion of the device of FIG. 1.

DETAILED DESCRIPTION OF THE ILLUSTRATED EMBODIMENT

Figure 2:
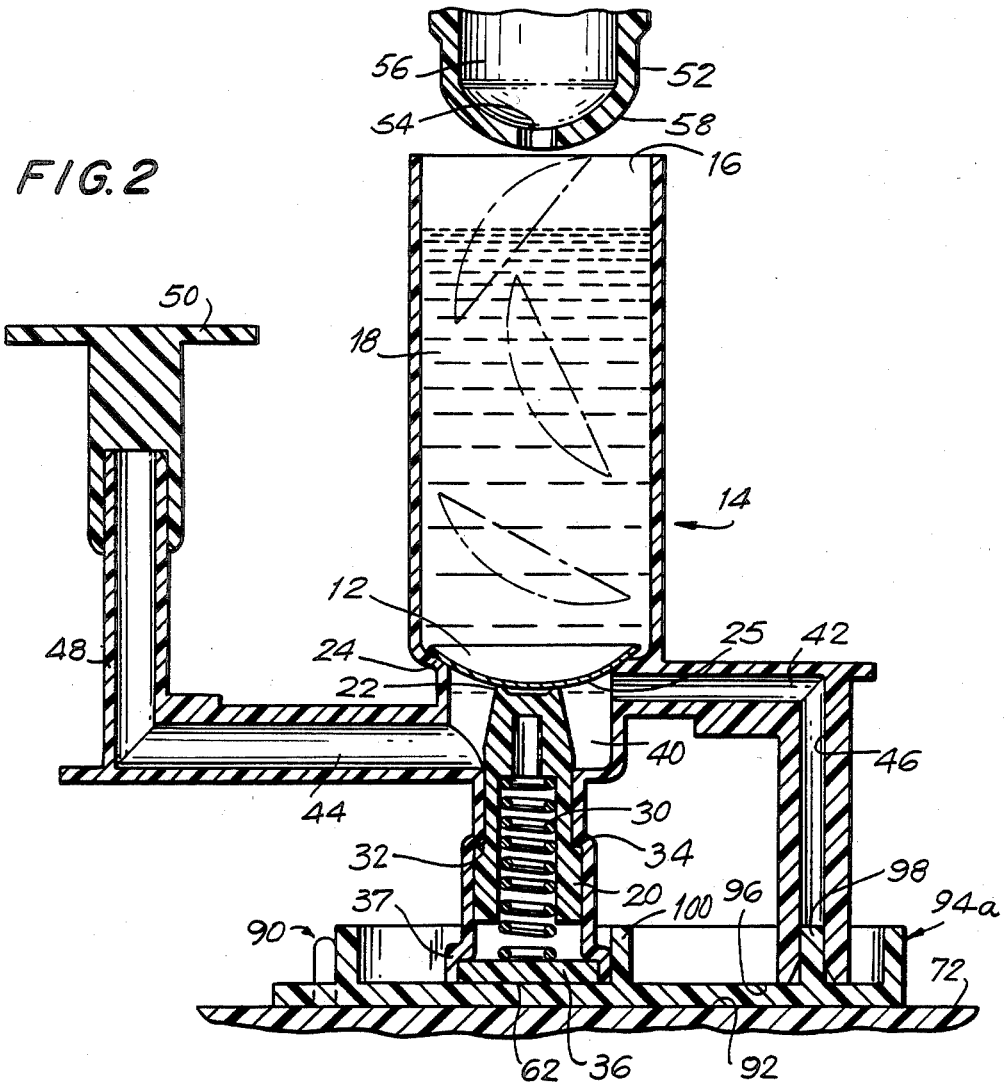
FIG. 2 is an enlarged sectional view illustrating a portion of the apparatus or device of FIG. 1 with the lens tinting fixture mounted thereto and further illustrating the initial placement of a contact lens within the fixture.

Referring now to the drawings and initially to FIG. 1, an inspection device or apparatus in accordance with the invention is designated generally by the reference numeral 10. This device or apparatus is particularly useful in connection with inspecting for or ascertaining the proper placement and orientation of a contact lens 12 in a lens tinting fixture 14, which is shown in additional detail in FIG. 2 to which reference is also invited. Briefly, this lens tinting fixture 14 is generally of the type disclosed in the above-referenced co-pending application Ser. No. 592,694 filed Mar. 23, 1984 now U.S. Pat. No. 4,518,390.

More particularly, the tinting fixture 14 is preferably configured for use with a lens tinting apparatus of the type shown and described in the above-referenced co-pending application, Ser. No. 715,095 filed Mar. 22, 1985, now U.S. Pat. No. 4,632,055 as specifically shown and described in that application. Accordingly, this fixture 14 need not be described in detail herein, but reference is invited to the above-referenced co-pending applications for a complete description of lens tinting fixtures of this general type, and of the particular lens tinting fixture 14 shown in connection with the present invention, respectively. However, it should be understood that the present invention is not limited in any way for use with the particular fixture shown herein. Rather, the method and apparatus of the invention may be utilized in connection with any suitable fixture, being limited only as set forth in the appended claims.

For purposes of understanding the invention, it will be useful to initially describe the fixture 14 and the desired centering or orientation of a contact lens therein preparatory to tinting of the same. In this regard, the fixture 14 includes a generally tubular body or tube 16 of somewhat greater diameter than the contact lens 12, which tube is filled with a saline or other solution during insertion of the lens. Hence, the lens 12 can be dropped or otherwise inserted within this elongate tube 16. One end of this tube is generally open while the other end is closed by a specially designed tube-closing and lens masking member or mask structure 20. The lens mask structure includes a generally annular or ring-like seat or mask portion 22 so as to mask a generally circular central portion of the lens 12.

The tube 16 also has an annular inwardly extending shoulder portion 24 which provides an outer mask member or portion for masking a radially outermost portion of the lens 12. Hence, only a desired, generally annular area 25 of the lens 12 between the respective masking members or portions 22 and 24 is exposed to the dye as will be presently described. To provide some resiliency in supporting, engaging and masking the desired portions of the contact lens 12, the seat or mask 22 is formed on the innermost end of the tube closure member 20 which is in turn biased, preferably by a spring 30, toward the lens 12. This spring biasing urges the mask seat 22 toward the lens 12 and into firm contact therewith. However, this plunger motion is limited or restrained by an additional shoulder 32 formed at a lower portion of the tube and a mating shoulder 34 formed on the plunger or closure member 20. The spring 30 and plunger 20 are retained within the tube structure 16 by an end cap or plug 36.

A generally annular open chamber 40 is provided at the closed end of the tube 16 surrounding the mask structure 22 for providing a tinting dye or medium to the unmasked annular portion 25 of the lens 12. To admit the fluid tinting medium or dye solution to the chamber 40, respective inlet and outlet ports 42 and 44 are provided in communication with chamber 40. In this regard, it should be recognized that the tinting fixture 14 is illustrated in FIG. 2 in a position 180 degrees rotated from its position during the tinting process. Hence, inlet port 42 includes a generally right-angled entry portion or conduit 46 in communication therewith which extends generally vertically upwardly when the fixture 16 is in place in a tinting apparatus. Such placement is illustrated for example in the above-referenced co-pending application Ser. No. 715,095, filed Mar. 22, 1985.

The inlet and outlet ports 42 are respectively vertically offset, to assure that an adequate amount of dye enters chamber 40 and circulates thereabout in contact with the annular area 25 defined on the lens 12. Additionally, the outlet port 44 has a right-angled and oppositely (to conduit 46) extending outlet conduit portion 48 which is initially provided with an end closure cap 50. During the tinting process outlet conduit 48 will extend vertically downwardly so as to permit the exit of the used tinting fluids or solutions therefrom.

Preferably, the tubular body 16 has an internal diameter, as mentioned above, somewhat larger than the outer diameter of lens 12. Moreover, the height of this tube 16 is on the order of two and one-half times the diameter of the lens. These dimensions are selected such that when the lens is dropped into the fluid-filled tube 16, it descends through the fluid and attains a state of dynamic equilibrium, generally convex side down as suggested by the depiction of the lens in varying positions in phantom line in FIG. 2, and its final position indicated by reference numeral 12. Hence, the hydro-dynamic forces acting upon the lens will tend to center the lens and achieve the desired orientation, generally centered with respect to the tube 16 and concentric with the respective generally annular masking members or portions 22 and 24.

To engage the lens 12 and secure it against the mask structures 22 and 24 an additional mandrel 52, only partially illustrated in FIG. 2, is utilized. Generally speaking, this mandrel 52 is sized for insertion within tube 16 and has a through central opening 54 to permit such insertion, by permitting entry of the fluid 18 into a generally hollow body cavity 56 thereof. The mandrel 52 is provided with a convex or rounded nose portion 58 adapted to engage the concave side of the lens 12. Preferably, the mandrel will also be gently released into the tube 16 and allowed to sink into the fluid and into the desired contact with lens 12 in a controlled fashion by the hydraulic forces provided by the fluid 18, in the same manner as was the lens 12. Further details of the structure of the mandrel 52 are illustrated and described in the above-referenced co-pending applications, to which reference is invited.

Figure 4:
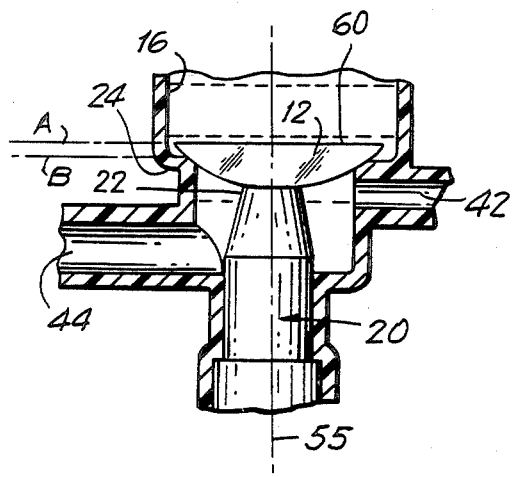
FIG. 4 is an enlarged partial sectional view of the tinting fixture shown in FIG. 2 illustrating the proper placement and orientation of a contact lens therein.
Figure 5:
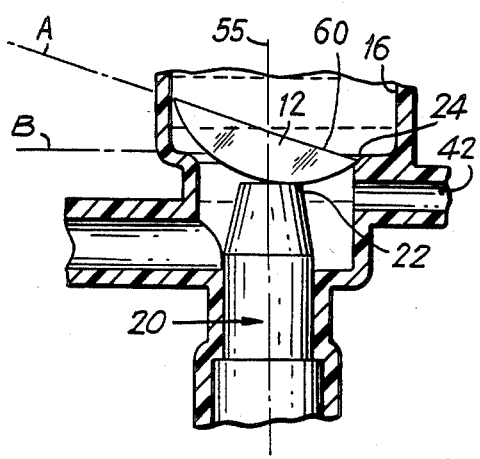
FIG. 5 is a view similar to FIG. 4 illustrating improper placement and orientation of a contact lens within the fixture.

Referring now also to FIGS. 4 and 5, respective correct and incorrect placements of contact lens 12 with respect to the tinting fixture 14 are illustrated. As shown in FIG. 4, when the contact lens 12 has been properly seated and centered with respect to the masking members 22 and 24 (as also illustrated in FIG. 2) a peripheral edge 60 of the contact lens 12 is substantially straight and level, and lies transversely of the axis of the elongate tubular member or tube 16.

Stated another way, when correctly aligned in the tinting fixture, peripheral edge 60 of the contact lens 12 defines or lies in a plane which is substantially parallel with a generally flat undersurface 62 of the fixture 14 which is generally defined by the outer surface of cap 36. Hence, the entire peripheral edge is substantially equidistant from this flat surface 62, such that when the fixture is rotated about the longitudinal axis 55 of tubular member 16, the peripheral edge 60 will appear to remain substantially level. It should be noted that the centers of annular masking members or portions 22 and 24 also lie along this axis 55. Accordingly, the edge 60 will appear, relative for example to the shoulder 24, to remain substantially at the same level. These respective levels are indicated in FIG. 4 by respective lines A and B.

In contrast, and referring to FIG. 5, if the contact lens 12 becomes tilted or canted somewhat within the fixture, the foregoing level condition or orientation of edge 60 will no longer be observed. In this regard, the tilting of the lens 12 has been exaggerated somewhat in FIG. 5 to facilitate the present description. In any event, as illustrated in FIG. 5, line A now bears a marked angular relation to line B, no longer being parallel with or remaining substantially level with respect thereto. Even a slight degree of such tilting or canting of the lens will become even more apparent upon rotation of the fixture about its axis 55.

Accordingly, the invention contemplates a method for visually ascertaining the desired alignment or orientation of the contact lens 12 in the tinting fixture 14. This method comprises aligning the fixture such that the contact lens, if in the desired orientation or alignment, is substantially centered with respect to the fixture and the peripheral edge thereof is substantially equidistant from, or defines a plane parallel with, a given, substantially flat end surface, such as surface 62, of the fixture. This method next contemplates rotating the fixture about its axis and observing the relative position of the peripheral edge during this rotation to thereby ascertain whether the contact lens is in the desired alignment relative to the fixture.

Figure 3:
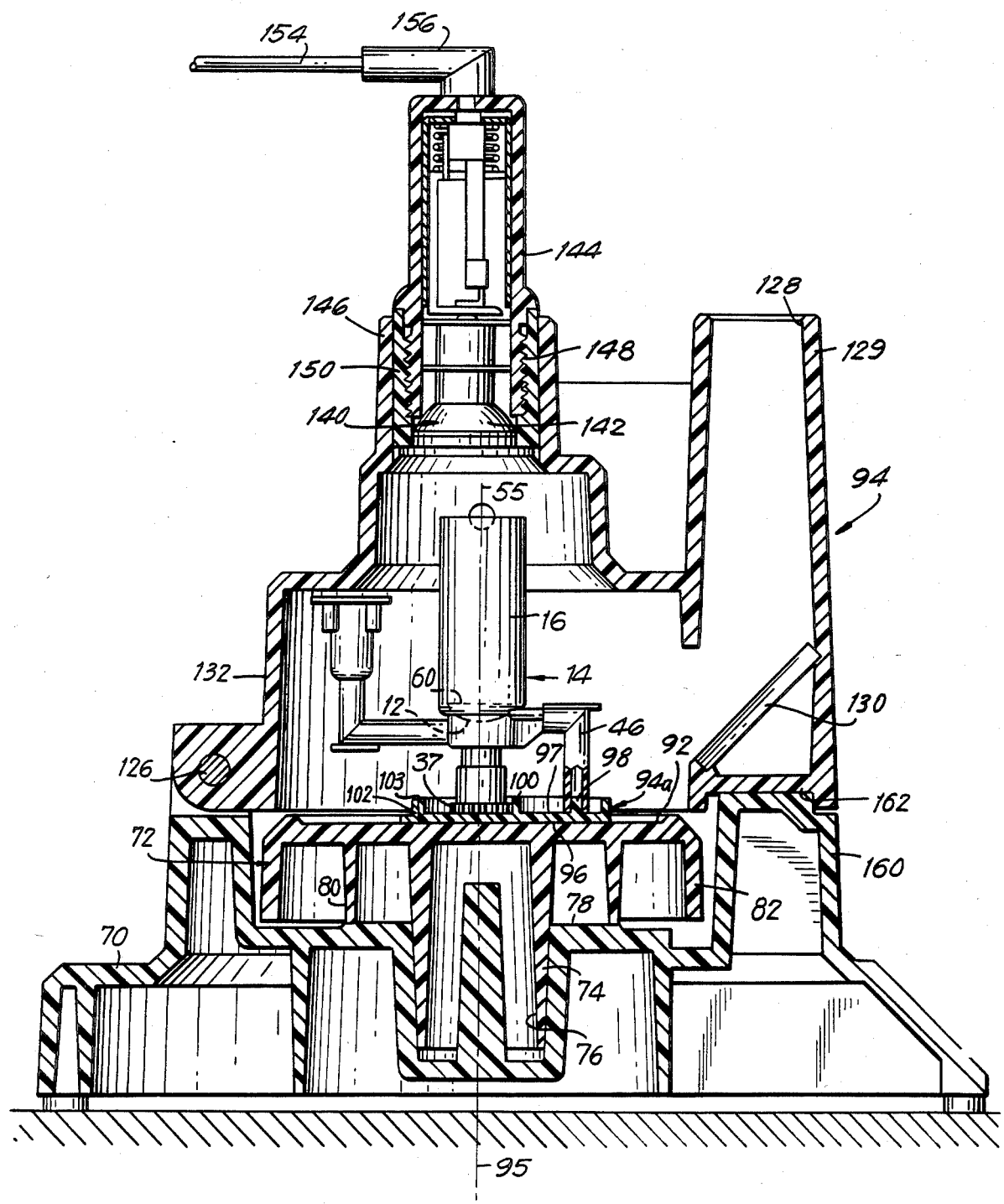
FIG. 3 is a sectional view taken through the inspection device or apparatus of FIG. 1 and also illustrating the lens tinting fixture of FIG. 2 installed thereupon preparatory to viewing for ascertaining proper placement of a lens therein.

Referring now to FIGS. 1 and 3, further details of the apparatus 10 for carrying out the visual inspection will now be described. The inspection apparatus or device 10 includes a base 70 and a platform 72 which is mounted to the base for rotation relative thereto. In the illustrated embodiment, as best viewed in FIG. 3, this mounting for rotation is accomplished by a generally cylindrical, and preferably somewhat tapered or frustro-conical downwardly extending shaft portion 74 of the platform 72. Shaft 74 is rotatably received within a complementary formed frusto-conical well or bore 76 in the platform 70. The assembled depth of shaft 74 with respect to well 76 is further defined by a slightly raised, generally circular bearing surface 78 of base 70 on which a complementary, generally annular bearing member or ring 80 of platform 72 slidably rotates.

The interior of platform 72 is preferably hollow, whereby no portion thereof, aside from annular bearing member or surface 80 and shaft 74 contacts the base 70. However, some degree of frictional engagement is desirable to maintain the platform in position, while permitting rotation when desired in response to slight manually or otherwise applied rotational forces sufficient to overcome the static friction. Preferably, an outer peripheral surface of the platform is knurled or serrated as indicated at reference number 82 to facilitate grasping thereof for manual rotation.

In order to obtain the desired alignment of the fixture 14 with the inspection device 10 for visual inspection of the mounting of contact lens therein, complementary cooperating mounting and alignment means are provided, and are designated generally by reference numeral 90. These mounting and alignment means 90 not only mount the fixture 14 for rotation in unison with the platform 72 but also align the fixture relative to a flat surface 92 of the platform in a predetermined fashion. This alignment of the fixture relative to the platform is such as to maintain the contact lens in an alignment wherein its entire peripheral edge 60, as described above will be located in a plane substantially parallel to the platform flat surface 92, if, and only if, this peripheral edge is in the desired alignment relative to the fixture as discussed above. This desired alignment relative to platform surface 92 is also illustrated in FIG. 2 wherein it will be noted that flat surface 62 of cap 36 is held parallel with flat surface 92 of platform 72. The mounting and alignment means 90 further holds the fixture substantially centered relative to the center of rotation of the platform 72. That is, axis 55 of the fixture as described above, is held substantially coincidental with an axis of rotation 95 of the platform 72.

Further in accordance with the invention, the inspection device or apparatus 10 includes novel viewing means designated generally by reference numeral 94 for visually observing the position of the contact lens peripheral edge. Preferably the edge 60 is observed during rotation of the platform 72 relative to the base 70 so as to thereby ascertain whether the contact lens is in the desired alignment relative to the tinting fixture 14.

Briefly, as described above, if the contact lens 60 is in the desired alignment relative to the tinting fixture, its peripheral edge 60 will be parallel with flat undersurface 36, then this edge will also be parallel with flat surface 92 of the platform 72. That is, the mounting and alignment arrangement to be described more fully hereinbelow maintains flat surface 62 substantially parallel with flat surface 92, such that the edge 60 of a properly mounting contact lens will also lie in a plane parallel to the latter. Moreover, it will be appreciated that with the center line or axis 55 of the fixture centered relative to the center of rotation 95 of platform 72, that a properly aligned and centered contact lens will also be centered relative to center line 95. Hence, visual observation of the peripheral edge 60 of lens 12 during rotation thereof will readily reveal whether the same is in the desired orientation, as illustrated and discussed above with reference to FIGS. 4 and 5. That is, if the lens is in the desired alignment and orientation it will appear substantially as shown in FIG. 4 throughout rotation thereof, whereas if the lens is not in the proper orientation it will, during at least some part of the rotation thereof, appear somewhat tilted, as shown in exaggerated fashion in FIG. 5.

In the illustrated embodiment, the fixture mounting and alignment means 90 comprises a stand 94a having a substantially flat upper and lower surfaces 96, 97. This stand receives the tinting fixture 14 mounted thereupon, and has locating means including an upwardly projecting pin member 98 and an arcuate upwardly projecting wall segment 100 for engaging and aligning the fixture 14 in a predetermined orientation. This orientation is such that the contact lens, if in the desired orientation and alignment relative to the fixture, will also be substantially centered with respect to the stand 94a and the peripheral edge 60 thereof will be in a plane parallel to flat undersurface 96. This alignment is illustrated in further detail in FIG. 2. In this regard, it will be noted that the pin 98 is located for engagement with the projecting tubular inlet elbow 46, while the arcuate wall member or segment 100 is located for engagement with a portion of the outer edge of a neck portion 37 of the fixture which receives the end cap 36. The location of pin 98 and locating wall member 100 is such as to substantially center the axis 55 with respect to the center of the stand 94a, which in the illustrated embodiment is substantially an equilateral triangle in form.

The mounting and alignment means 90 further includes complementary interfitting means on the platform and on the stand for mounting the stand in a centered position relative to the platform. These latter interfitting means include a protruding locating tab 102 extending from a peripheral edge of the stand 94 and slot defining means 103 on the platform which in the illustrated embodiment comprise a pair of spaced apart upstanding tab-like wall segments for defining a complementary slot 105 therebetween for receiving the locating tab 102 therein. These upstanding tab-like members 103 also form a partial abutment surface for abutment with a peripheral wall 104 of stand 94a from which tab 102 projects.

Preferably, these interfitting means further include the peripheral wall 104 of predetermined contour on the stand 94a. In the illustrated embodiment the wall 104 is generally triangular in form, corresponding to the general triangular form of stand 94a. One or more additional abutment means or surfaces, which in the illustrated embodiment are defined by upstanding flat elongate wall segments or members 108 which extend from the flat surface 92 of the platform are located and oriented for complementary engagement with at eleast a portion of this peripheral wall 104. In the illustrated embodiment, the abutment members 108 are generally formed and located so as to embrace two converging sides 110, 112 of the generally triangularly shaped peripheral wall 104.

Referring briefly to FIG. 6, the portion of the mounting and alignment means may alternatively comprise a well or recess 120 in the platform which is here designated 72a. This recess 120 defines the relevant flat surface, here designated 92a, of the platform 72a at its bottom and has a complementary peripheral configuration for receiving the peripheral wall 104 at least partly recessed therein. Hence, the recess 120 is substantially triangularly configured to correspond with the peripheral configuration of the stand 94a. In order to assure the desired orientation of the generally equilateral triangular stand 94a, an additional means such as a locating dot 122 may also be provided adjacent the well or recess 120, and the locating tab 102 aligned with this locating dot.

It will be appreciated that other equivalent forms of the foregoing alignment structures and arragnements may be utilized without departing from the invention, the foregoing being by way of example only and in no way limiting. Preferably, platform 72 is of substantially circular configuration to facilitate rotation thereof by grasping of peripheral knurled surface 82.

In the illustrated embodiment, the viewing device 10 further includes a cover member 124 which is hingedly mounted at 126 to one side of the platform 72 for removably overlying the tinting fixture when it is mounted thereto. Preferably, the cover member 124 is configured so as to overlie the platform flat surface 92 and substantially exclude extraneous light therefrom to facilitate viewing of the edge 60 of lens 12 as will be more fully described presently. The viewing means 94 preferably comprises an eyepiece or viewing opening 128 offset to one side of the cover, and preferably opposite hinge 126. The viewing means 94 may further comprise an elongate tubular upstanding member 129 which terminates at or defines at its upper end this open end or eyepiece 128 which if desired may be covered with an additional transparent member (not shown). The viewing means further includes a reflecting means or member 130 oriented optically intermediate the eyepiece opening 126 and the fixture 14 when mounted to platform 72 so as to permit viewing of the contact lens in the fixture 14 from the eyepiece opening 126.

In this latter regard, the tubular member or tube 16 of the fixture is formed of a transparent material so as to permit viewing of the contact lens 12 therein, as generally indicated in FIG. 3. As also illustrated in FIG. 3, the reflecting means comprises a mirror or similar reflecting member which is disposed at generally a 45-degree angle generally at a bottom end portion of the tubular member 129. The horizontal alignment of mirror 130 generally centers the same with respect to the location of contact lens 12 within fixture 14 when mounted to the platform 72 (by way of stand 94a and surface 92).

Preferaby, the cover member 124 is configured with a generally cylindrical, downwardly depending skirt 132 for surroundingly embracing a portion of the platform 72 peripheral to the fixture 14 when mounted thereupon so as to substantially preclude impingement of external light thereupon. Accordingly, in order to enhance viewing of the contact lens 12 under controlled lighting conditions, an additional light source or illuminating means 140 is provided, preferably in the form of a suitable lamp or incandescent bulb element which includes a surrounding reflector element 142. Preferably the lamp and surrounding reflector element 142 are located in an upper, electrical housing member 144 which is threadably engaged with an upwardly extending open-ended mounting portion 146 of the cover 124, as indicated generally at 148. A suitable threaded insert 150 may be provided for this purpose. The reflector 142 is preferably aligned at or relatively near the center line or axis 55 of fixture 14 when mounted to platform 72 so as to cast a relatively uniform beam of light on the contact lens 60 therein.

An additional supporting and locating member 160 may also be provided projected from base 70 for engaging a complementarily formed alignment and abutment member or portion 162 of the cover 124 in order to define the closed position thereof relative to platform 72. While the lamp or illuminating means 140 may be battery powered if desired, suitable provision is also made for accommodating an external power source as generally indicated by an electrical cable 154 and suitable connector 162 in FIG. 3.

In accordance with the method of the invention, as described above, following initial placement of the contact lens in the tube 16, the fixture 14 is mounted to the stand 94a and the stand 94a mounted to platform 72 as described above. Thereupon, the cover 124 is closed, and the lamp 140 turned on and the platform rotated to observe the position of the contact lens 12. If the contact lens 12 is found to be out of the desired alignment, a suitable elongate, preferably rounded-ended tool (not shown) may be gently inserted into the tube 16 to properly center and align the contact lens therein. When the lens is observed to be properly aligned by rotating platform 72 and visually observing as described above, the mandrel 52 may be placed in the fixture to hold the contact lens in place preparatory to tinting, as briefly described above and as more fully described in the above-reference co-pending applications. Thereupon, the method of the invention contemplates again rotating platform 92 and visually observing the contact lens peripheral edge a second time to ascertain the continued desired alignment thereof after placement of the mandrel 52.

While particular embodiments of the invention have been shown and described, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed a follows:

1. An inspection device for visually ascertaining the desired alignment of a contact lens in a tinting fixture, comprising: a base; a platform having a flat surface and mounted to said base for rotation relative thereto; cooperating mounting and alignment means for mounting said fixture for rotation in unison with said platform and for aligning said fixture relative to said platform flat surface in such a way as to maintain the contact lens in an alignment wherein substantially an entire peripheral edge thereof is located in a plane substantially parallel to said platform flat surface, if the contact lens is in the proper desired alignment in said tinting fixture, and such that the tinting fixture is centered relative to the center of rotation of said platform; and viewing means for visually observing the position of said contact lens peripheral edge during rotation of said platform relative to said base to thereby ascertain whether the contact lens is in the desired alignment relative to said tinting fixture.

2. A device according to claim 1 wherein said mounting and alignment means includes a stand having a flat surface for receiving said tinting fixture mounted thereupon; said stand having locating means for engaging said fixture so as to locate the same in a predetermined orientation, such that said contact lens, if in the desired alignment relative to said tinting fixture, is substantially centered with respect to said stand, with the entire peripheral edge thereof lying in a plane substantially parallel to said flat undersurface.

3. A device according to claim 2 wherein said mounting and alignment means further includes complementary interfitting means on said platform and on said stand.

4. A device according to claim 3 wherein said complementary interfitting means includes a protruding locating tab on said stand member and slot defining means on said platform defining a complementary slot for receiving said locating tab therein.

5. A device according to claim 3 wherein said interfitting means further includes a peripheral wall portion of predetermined contour on said stand and means defining an abutment surface of complementary contour for abutting and aligning with said peripheral wall portion.

6. A device according to claim 5 wherein said abutment surface defining means comprises an upstanding member extending from said flat surface of said platform and shaped for complementary engagement with a predetermined portion of said peripheral wall portion of said stand.

7. A device according to claim 5 wherein said abutment surface defining means comprises a recess in said platform defining said flat surface thereof and having a complementary peripheral configuration for receiving said peripheral wall portion recessed therein.

8. A device according to claim 1 wherein said platform is of a substantially circular configuration.

9. A device according to claim 8 wherein said platform has a downwardly extending central shaft-like member and wherein said base has a bore for rotatably mounting said shaft-like member.

10. A device according to claim 1 and further including a cover for removably overlying said tinting fixture and said platform flat surface; and wherein said viewing means comprises an eyepiece opening in said cover offset to one side thereof and reflecting means oriented for permitting viewing of the contact lens in said fixture from said eyepiece opening.

11. A device according to claim 10 and further including illuminating means for facilitating viewing of said lens with said cover member closed.

12. A device according to claim 10 wherein said cover is hingedly connected with said base, and is further configured and disposed for surroundingly embracing a portion of said platform member peripheral to said fixture when mounted thereupon so as to substantially preclude impingement of external light thereupon.

13. A method for visually ascertaining the desired alignment of a contact lens in a tinting fixture defining an axis, comprising: aligning said fixture such that said contact lens, if in the desired alignment in said fixture, is substantially centered with respect to said fixture axis and an entire peripheral edge thereof is in a plane substantially parallel with a given, substantially flat end surface of said fixture; rotating said fixture about its axis; and visually observing the relative position of said peripheral edge during said rotation to thereby ascertain whether the contact lens is in the desired alignment relative to said tinting fixture.

14. A method according to claim 13 wherein said step of rotating and observing includes a step of rotating and observing a first time following initial placement of said lens within said fixture, and thereafter placing mandrel means in said fixture to fixedly mount the contact lens relative thereto, and thereafter rotating and visually observing said contact lens peripheral edge a second time to ascertain the continued desired alignment thereof.

15. A method according to claim 13 and further including the steps of substantially excluding ambient light during said observation, and illuminating at least said contact lens in the area to be visually observed with a controlled source of illumination at a predetermined position relative thereto.

* * * * *